June 2, 1970 R. K. FRILL ETAL 3,515,288
DRAFT APPARATUS WITH TENSION-BREAKABLE EMERGENCY RELEASE MEANS
Filed April 18, 1968 3 Sheets-Sheet 2

INVENTORS
RICHARD K. FRILL
JOHN R. REISS
BY
Ralph W. McIntire, Jr.
ATTORNEY

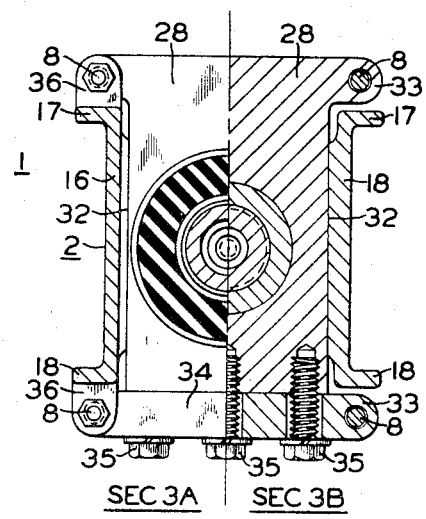

United States Patent Office 3,515,288
Patented June 2, 1970

3,515,288
DRAFT APPARATUS WITH TENSION-BREAKABLE EMERGENCY RELEASE MEANS
Richard K. Frill, Pittsburgh, and John R. Reiss, North Versailles, Pa., assignors to Westinghouse Air Brake Company, Wilmerding, Pa., a corporation of Pennsylvania
Filed Apr. 18, 1968, Ser. No. 722,362
Int. Cl. B61g 9/04, 9/12
U.S. Cl. 213—64                4 Claims

ABSTRACT OF THE DISCLOSURE

Draft apparatus with tension-breakable emergency release means, in which a pair of telescopically movable members compress therebetween a cushion member for transmitting buff or draft forces between the members, the cushion member being normally caged between a pair of axially spaced thrust members on one of the members for normal operation of the draft apparatus, one thrust member opposing the draft force and the other thrust member opposing the buff force, the thrust member opposing the buff force being releasably attached to the one member in a normal position by externally mounted tension-breakable bolts subject to breakage upon application of a buff force on the one thrust member exceeding a predetermined value, thereby releasing the cushion member and the other member for telescopic movement beyond the normal buffing limit, thereby permitting engagement of the anti-climbing plates on the vehicles attached to opposite ends of the draft apparatus.

BACKGROUND OF INVENTION

Heretofore, in draft apparatus of the type generally described above, it has been proposed to construct the one telescopic member in the form of a tube having disposed therein a buff opposing thrust member in the form of an axially movable grommet releasably attached to the one telescopically movable member by way of a plurality of shear bolts, which bolts, in order to perform their shear function to release the axially movable thrust member, must necessarily be disposed transversely of the direction of the buffing force so that a portion of each bolt is disposed in the grommet member and another portion of the bolt is disposed in the one draft member. With this type of arrangement, the removal of that portion of the bolt in the grommet member after the shear bolts have been sheared, necessitates the disassembly of the draft apparatus or at least alignment of the bores in the grommet and the one member, and thereafter drilling and tapping each bolt portion to effect its removal from the grommet member.

SUMMARY OF INVENTION

It is the object of the present invention to provide in an emergency release means in draft apparatus of the type above described, externally disposed, easily replaceable tension-breakable bolt means to effect telescopic collapse of the draft apparatus under emergency conditions arising due to excessive buffing force.

In the present invention, this object is achieved by providing two members, one telescopically movable within the other and each adapted for connection to a respective vehicle. A deformable cushion member is disposed between the two members to transmit draft force from the one member to a draft force opposing thrust member on the other member and to transmit buff force from the one member to a buff force opposing thrust member separate from and attached to the one member by tension-breakable bolts axially extending in a direction parallel to the direction of the buff and draft forces. Upon application of a buff force to the buff opposing thrust member in excess of a predetermined maximum tension on the connecting tension-breakable bolts, the buff opposing thrust member is released relative to the one member for axial movement in the buff direction relative to the one member, thereby effecting collapse or relative retraction of the two members toward one another, sufficiently beyond the limit normally provided by the buff opposing thrust member before breakage of the tension bolts, to permit engagement of the anti-climbing plates on the adjacent ends of vehicles interconnected by the draft apparatus. To provide external disposition of the tension-breakable bolts to facilitate easy replacement thereof, the buff opposing thrust member is provided with ear members extending transversely thereof through openings in the one member for axial mating engagement with similar externally disposed ears on the one member, each tension bolt connecting one of the ears on the thrust member to the mating ear on the one member.

This and other objects will become more readily apparent in the following description, taken with the drawing, in which:

FIG. 3 is a sectional view of the draft apparatus of FIG. 1, the left half comprising a section taken substantially along the line 3A—3A of FIG. 2 and the right half comprising a section taken substantially along the line 3B—3B of FIG. 2.

Figure 1:
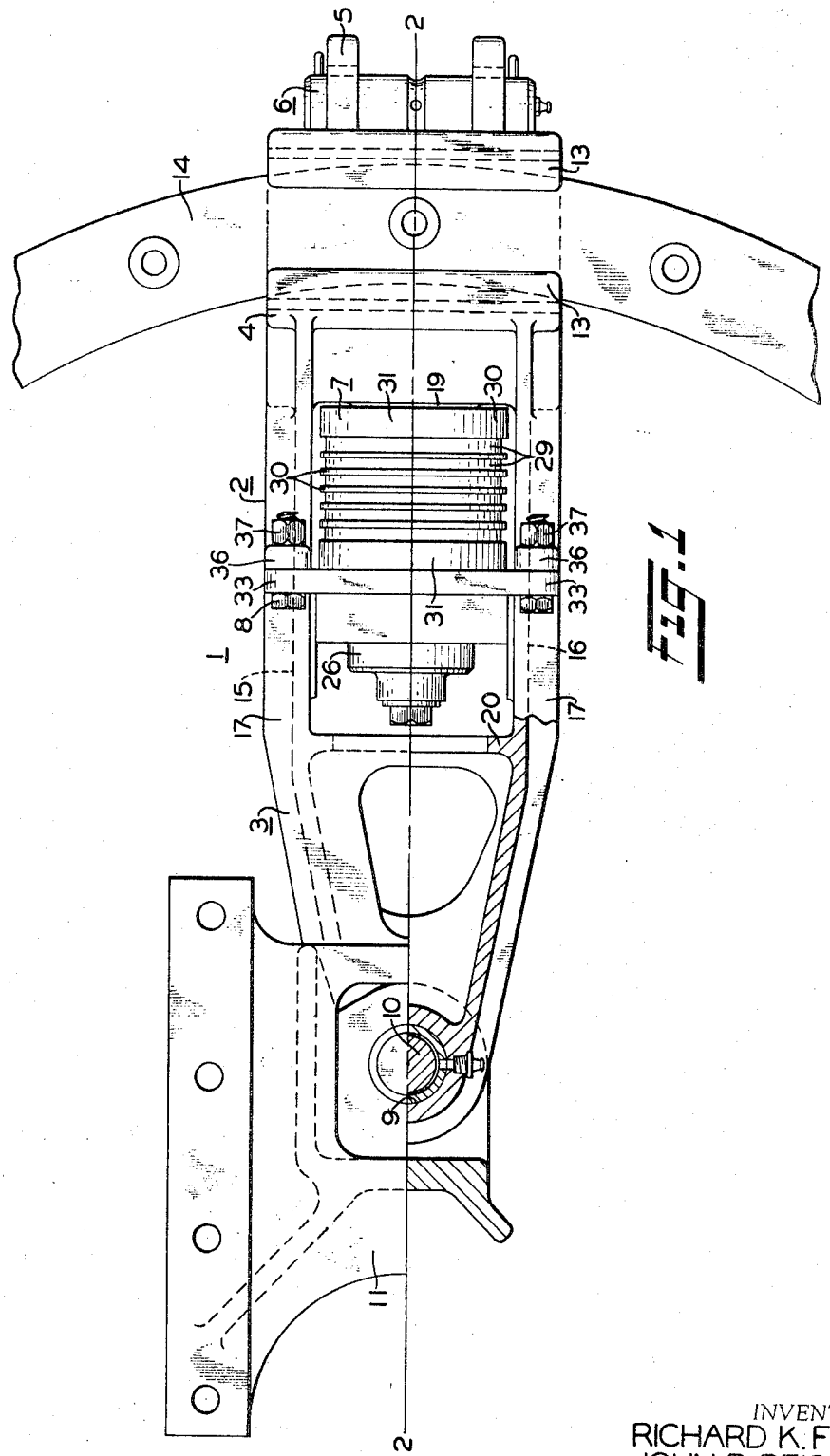
FIG. 1 is a top plan view, taken partly in section, of a draft apparatus showing my invention.

Referring now to the drawing, there is shown a draft apparatus, generally indicated at 1, and comprising an open-frame housing 2 having an integral draw bar assembly 3 at one end and an upwardly extending integral hook 4 at the other end, a coupler yoke 5 having one end telescopically disposed within housing 2 and carrying a coupler head pivot 6 on the distal end, a cushion assembly 7 disposed within the housing 2 to cushion and transmit buff and draft forces from yoke 5 to housing 2 and draw bar 3, and an emergency release assembly 8 to facilitate collapse of the draft apparatus upon the application of excessive buffing force to coupler yoke 5.

The distal end of the draw bar 3 is provided with a vertically extending opening 9 receiving therein a pin assembly 10 attaching the draw bar to a support member 11, which in turn is attached to the undercarriage of a vehicle 12, such as a railway car, facilitating horizontal pivotal connection of the entire draft assembly to the vehicle 12. Vertical support for the entire draft apparatus is provided by the hook 4 having inwardly extending arms 13, 13 overlying a sector bar 14 fixedly suspended from the undercarriage of vehicle 12, the hook 4 and sector bar 14 providing the free pivotal movement of the draft assembly about pivot support 11, in a manner heretofore known in the art.

The aforementioned open-frame housing 2 has closed sides, an open top, and an open bottom, as formed by a pair of laterally spaced vertical housing members 15, 16 extending parallel to the axis of the draft apparatus, each housing member having an upper and a lower laterally outwardly extending flange 17, 18, respectively, for purposes hereinafter described in detail. The housing members 15, 16 are fixed in parallel disposed relationship by integral forward and rear end walls 19 and 20, respectively. The forward wall 19 serves as a thrust member, as hereinafter described, and includes centrally therein an opening comprising the end of an integral tubular member 21 serving as a guide member for reciprocable movement of the yoke member 5 therein. The end wall 20 includes a central opening aligned with tubular member 21 for receiving therethrough with clearance the distal end of the yoke member 5.

The yoke member 5 comprises an elongated cylindrical member having a major portion thereof disposed for reciprocable axial movement within housing 2 and includes at the distal end thereof a horizontally disposed pivot 6 for pivotally attaching thereto, and for vertical movement thereabout, a suitable coupler head, not shown, of the type, for example, as disclosed and claimed in Pat. No. 3,280,990, filed by William B. Jeffrey et al. and patented Oct. 25, 1966. A coupler head biasing assembly 22 is supported on the distal end of the yoke 5 to bias the coupler head to a predetermined horizontal position about pivot assembly 6. That portion of the yoke 5 which is telescopically received within housing 2 comprises a first cylindrical portion 23 axially slidably received in previously described tubular member 21 of housing 2, a necked portion 24 forming at its forward end with cylindrical portion 23 a radial shoulder 25, and forming at its rearward end, at a juncture with a head member 26 threadedly fixed on the end of the yoke, a second radial shoulder 27 axially spaced from the first radial shoulder 25. Head member 26 is substantially the same diameter as the first cylindrical portion 23 and is axially slidably received in a central bore in a separate thrust member 28 releasably attached to housing 2 by the hereinafter described emergency release means.

Figure 2:
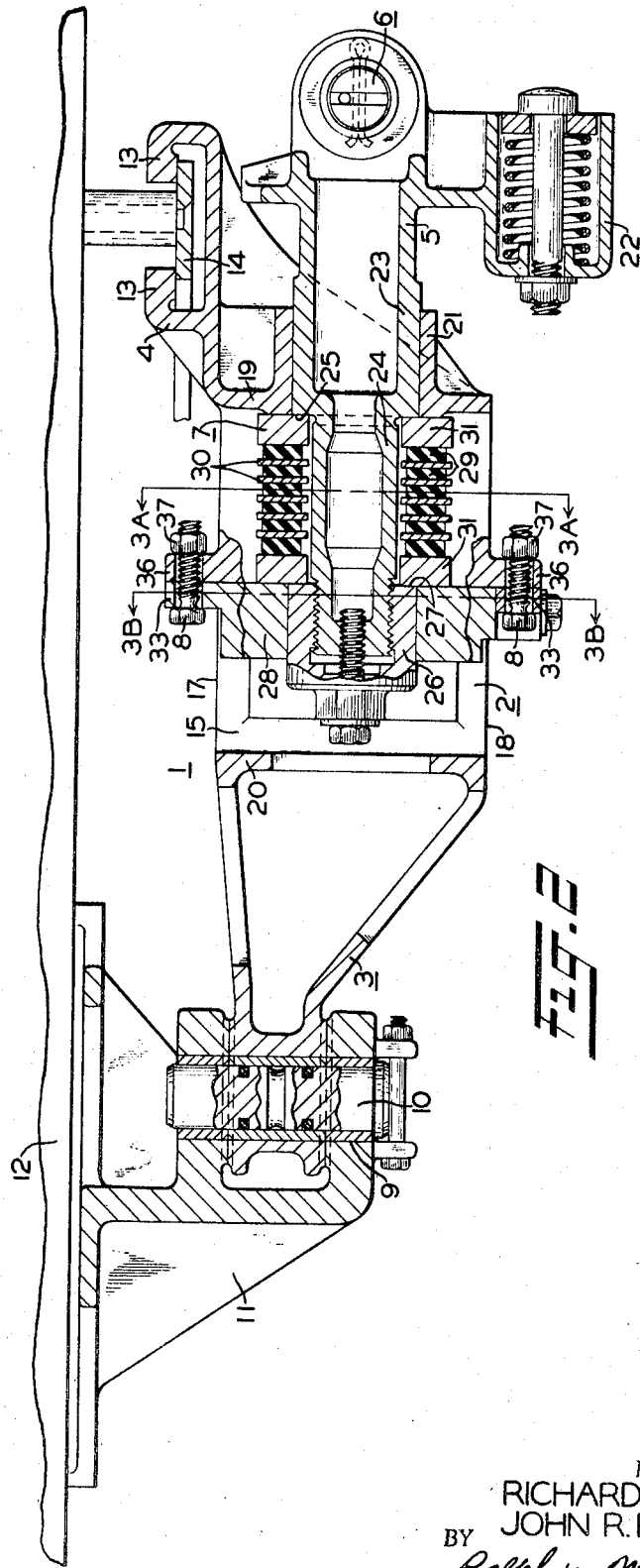
FIG. 2 is a side elevational view of the draft apparatus of FIG. 1, taken partly in section substantially along the line 2—2 of FIG. 1.

The aforementioned cushion assembly 7 for transmitting cushioned buff and draft forces from yoke 5 to housing 2, bar 3 and the undercarriage of vehicle 12, comprises a plurality of annular resilient members 29 interposed between a plurality of annular metal members 30, and having a pair of metal end members 31. The entire cushion assembly comprises a tubular member encircling the necked portion 24 of yoke member 5, with the forward metal end member 31 having its outer annular portion engaging end wall 19 and the inner annular portion thereof engaging radial shoulder 25 on yoke member 5. Similarly, the rearward metal member 31 has its outer annular portion engaging the forward end of the thrust member 28, and the inner annular portion thereof engaging radial shoulder 27 of yoke member 5, when the draft apparatus is in the unstressed condition as shown in FIGS. 1 and 2 of the drawing.

In describing the operation of the draft apparatus as thus far described, it will be seen that buff or draft forces applied to yoke 5 will cushion the normal forces that occur between cars while coupling or while running coupled, it being understood that a coupler head on the end of yoke 5 will be coupled to a mating coupler head on a draft apparatus on the next car. When yoke 5 is placed under normal draft force, yoke 5 is extended relative to housing 2 so that radial shoulder 27 compresses cushion assembly 7 a few inches to gradually apply the full draft force against end wall 19 of housing 2 acting as a thrust member transmitting the draft force to undercarriage 12 by way of housing 2, draw bar 3, and support 11. Similarly, when yoke 5 is placed under a buffing force, yoke 5 is telescoped within housing 2 so that radial shoulder 25 compresses cushion assembly 7 a few inches thereby applying the cushioned buff force to thrust plate 28, which, by virtue of its rigid attachment to housing 2, transmits the buff force to undercarriage 12 by way of housing 2, draw bar 3, and support member 11. The cushion member 7 is designed to limit telescopic movement of yoke 5 relative to housing 2 in either direction to a distance of about 1½ inches to maintain the separation of adjacent cars for all normal buffing forces.

In accordance with the present invention, emergency release mechanism 8, comprising a plurality of tension-breakable bolts, is provided to release thrust plate 28 relative to the housing 2 to permit unrestricted telescoping of yoke member 5 within housing 2 an amount sufficient to provide engagement of known conventional anti-climbing plates, not shown, on adjacent cars, when the tension-breakable bolts are stressed by buff forces exceeding a predetermined amount, for example, 115,000 pounds an amount indicating that adjacent cars will tend to climb over one another unless the anti-climbing plates on the cars are engaged.

In now describing the emergency release structure, it is seen that the major portion of separate thrust plate 28 is disposed within the housing 2 and is basically rectangular in form, and having a lateral width such as to provide a close tolerance fit between opposing side 32, 32 and the aforementioned housing members 15, 16 of housing 2, in a manner most clearly shown in FIG. 3 of the drawing. The height dimension of thrust plate 28 is greater than that of the housing members 15, 16 so that portions thereof extend upwardly and downwardly through the open top and the open bottom, respectively, of housing 2, the upper and bottom ends thereof each provided with a pair of laterally extending integral ear or lug members 33, each ear member having a hole therethrough to receive a tension-breakable bolt 8, and disposed to overlie one of the flanges or rails 17, 18 on the housing members 15, 16 so that the thrust plate 28 is disposed for free axial movement along the housing in the buff direction to the end wall 20 while being substantially caged laterally of the housing to prevent loss of the thrust plate 28 after an emergency release operation has occurred. In order to facilitate installation of the thrust plate 28 between the housing members 15, 16, the lower end portion of plate 28 which includes two of the ears 33, comprises a separate plate 34 attached to the bottom end of plate 28 by way of bolts 35 after the plate 28 is disposed between the housing members 15, 16 in the manner disclosed in the drawing. The opening in each of the four ears 33 on plate 28 laterally overlies the corresponding rail in axial registration with an opening in one of a plurality of outwardly extending mating ears or lugs 36 integral with rails 17 and 18 and disposed intermediate the ends of housing members 15, 16. A tension-breakable bolt 8 is disposed through the mating openings of each pair of mating ears 33, 36 to rigidly fix the thrust member 28 to the housing 2 in cooperation with a nut 37 disposed on the distal end of each tension bolt.

In now describing the operation of the emergency release means, as above described, the tension-breakable bolts are designed to break under predetermined tension exceeding a normal buff force, for example, 150,000 pounds. Therefore, when a buff force exceeding this amount is applied to yoke 5 compressing cushion assembly 7 so as to apply this force to the forward end of thrust member 28, thereby applying this force axially of tension bolt 8, the bolts will break, releasing thrust member 28 relative to the housing, whereupon thrust member 28, cushion member 7 and yoke 5 will be free to move axially of the housing a distance equal to the clearance between the rear end of thrust number 28 and the end wall 20 of the housing 2, a distance calculated to provide sufficient telescoping of yoke 5 relative to housing 2 to permit engagement of the anti-climbing plates on the adjacent ends of the adjacent cars attached to the opposite ends of the draft apparatus.

Having now described the invention, what we claim as new and desire to secure by Letters Patent, is:

1. A draft apparatus, comprising:
    (a) two members each longitudinally movable relative to the other,
    (b) means for connecting each of said members to a respective vehicle, (c) one of said members including a pair of longitudinally spaced thrust members, (d) resilient means interposed between said thrust members and engageable by said other of said members to transmit draft force from said other member to one of said thrust members and to transmit buff force from said other member to the other of said thrust members, (e) said other of said thrust members disposed for movement in the buff direction from a normal position relative to said one member, (f) emergency release means rigidly securing said other thrust member to said one member in said normal position in opposition to said buff force, and (g) said emergency release means comprising tension-breakable means adapted to break upon the application of an abnormal buff force thereto.

2. A draft apparatus, as recited in claim 1, in which said tension-breakable means comprises tension-breakable bolt means.

3. A draft apparatus, as recited in claim 1, in which:
(a) said one member includes a housing having aperture means therein extending from said normal position in the buff direction of movement of said other thrust member,
(b) said other member is disposed for telescopic movement within said housing,
(c) said pair of thrust members are disposed within said housing,
(d) said other of said pair of thrust members having portions extending externally of the housing through said aperture means,
(e) lug means fixed on the exterior of said housing,
(f) said tension-breakable means connecting said portions of said other thrust member to said lug means.

4. A draft apparatus, as recited in claim 3, in which:
(a) said housing comprises a pair of laterally spaced housing members with the space between said housing members comprising said slot means,
(b) said portions of said other of said thrust members laterally extending to exteriorly overlie said pair of housing members to laterally cage said other thrust member relative to said pair of housing members, and
(c) said lug means being disposed on said housing members intermediate the ends thereof.

References Cited
UNITED STATES PATENTS

| | | | |
|---|---|---|---|
| 2,083,054 | 6/1937 | Cline | 285—139 |
| 2,802,580 | 8/1957 | Larsson | 213—45 |
| 2,802,581 | 8/1957 | Larsson | 213—45 |
| 3,351,214 | 11/1967 | Herbert | 213—62 X |

DRAYTON E. HOFFMAN, Primary Examiner

U.S. Cl. X.R.

213—12, 62